(12) United States Patent
Hayatdavoudi et al.

(10) Patent No.: US 11,028,306 B2
(45) Date of Patent: Jun. 8, 2021

(54) SOLID/LIQUID HIGH FILM STRENGTH FLUID LUBRICANT

(71) Applicant: University of Louisiana at Lafayette, Lafayette, LA (US)

(72) Inventors: Asadollah Hayatdavoudi, Lafayette, LA (US); Gordon Guillory, Deridder, LA (US); Peter Schexnayder, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 28 days.

(21) Appl. No.: 16/210,505

(22) Filed: Dec. 5, 2018

(65) Prior Publication Data

US 2019/0169481 A1 Jun. 6, 2019

Related U.S. Application Data

(60) Provisional application No. 62/594,730, filed on Dec. 5, 2017.

(51) Int. Cl.
*C09K 8/14* (2006.01)
*C09K 8/24* (2006.01)
*C09K 8/16* (2006.01)

(52) U.S. Cl.
CPC ............ *C09K 8/145* (2013.01); *C09K 8/16* (2013.01); *C09K 8/24* (2013.01); *C09K 2208/34* (2013.01)

(58) Field of Classification Search
None
See application file for complete search history.

(56) References Cited

U.S. PATENT DOCUMENTS

| | | | | |
|---|---|---|---|---|
| 2,885,358 A | * | 5/1959 | Reddie | C09K 8/36 507/128 |
| 3,001,853 A | * | 9/1961 | Hemstock | C01B 33/26 502/410 |
| 3,006,845 A | * | 10/1961 | Van Dyke | C09K 8/36 507/131 |
| 3,558,545 A | * | 1/1971 | Lummus | C08L 33/08 507/120 |
| 3,979,303 A | | 9/1976 | Kang et al. | |
| 4,217,146 A | * | 8/1980 | Avdzhiev | C08K 3/22 106/285 |

(Continued)

FOREIGN PATENT DOCUMENTS

WO 96/03474 A2 2/1996

*Primary Examiner* — John J Figueroa
(74) *Attorney, Agent, or Firm* — Lauren J. Rucinski; Russel O. Primeaux; Kean Miller LLP

(57) ABSTRACT

GSH Dry Lubricant Additive is, chemically, magnesium aluminum silicate. It is a clay rich in titanium, magnesium, and aluminum. As an inanimate object, it does not "function" per se, but rather its properties are as such that it is highly beneficial to the drilling industry. It has a naturally high lubricity, a high stall torque, high gel strength, but a low plastic viscosity. This means that it effectively cools the bit while drilling, reduces friction in the system, supports cuttings better, but is easier to break out of a static gel strength than traditional engineered muds. Finally, as a high suspendability, low solids content material, it acts as a natural gel-state cement for unconsolidated LCM particles, effectively strengthening the wellbore.

8 Claims, 15 Drawing Sheets

(56) References Cited

U.S. PATENT DOCUMENTS

| | | | |
|---|---|---|---|
| 4,547,298 A * | 10/1985 | Novak | C04B 14/36 |
| | | | 166/294 |
| 4,915,845 A * | 4/1990 | Leighton | B01F 17/0057 |
| | | | 210/701 |
| 5,358,044 A * | 10/1994 | Hale | C04B 18/049 |
| | | | 166/293 |
| 2004/0043906 A1 * | 3/2004 | Heath | C09K 8/536 |
| | | | 507/200 |
| 2008/0302570 A1 | 12/2008 | deBoer | |
| 2014/0262283 A1 * | 9/2014 | Savari | E21B 21/003 |
| | | | 166/305.1 |
| 2016/0122613 A1 | 5/2016 | Zhou et al. | |
| 2016/0230072 A1 * | 8/2016 | Reddy | C09K 8/512 |

* cited by examiner

SOLID/LIQUID HIGH FILM STRENGTH FLUID LUBRICANT

CROSS REFERENCE TO RELATED APPLICATION

This application claims priority to U.S. Provisional Application No. 62/594,730 "SOLID/LIQUID HIGH FILM STRENGTH DRILLING FLUID LUBRICANT" filed Dec. 5, 2017.

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

Table 1 presents the analytical results of an elemental spectrum analysis within the rectangle, FIG. 1a Table 2 presents the analytical results of an elemental spectrum analysis within the rectangle, FIG. 2a.

Table 3 presents rheological properties of mud and dry lubricant suspension.

Table 4 presents lubricity and stalling torque test analysis.

Table 5 presents film strength measured using Extreme Pressure Test (EP Test) at varying concentrations.

DESCRIPTION OF THE DRAWINGS

The drawings constitute a part of this specification and include exemplary embodiments of the SOLID/LIQUID HIGH FILM STRENGTH FLUID LUBRICANT, which may be embodied in various forms. It is to be understood that in some instances, various aspects of the invention may be shown exaggerated or enlarged to facilitate an understanding of the invention. Therefore the drawings may not be to scale.

FIG. 1b provides an elemental spectrum of the rectangular area identified in FIG. 1a.

FIG. 2(b) presents elemental spectrum of the rectangular area identified in FIG. 2a.

FIELD OF THE INVENTION

Figure 1A:
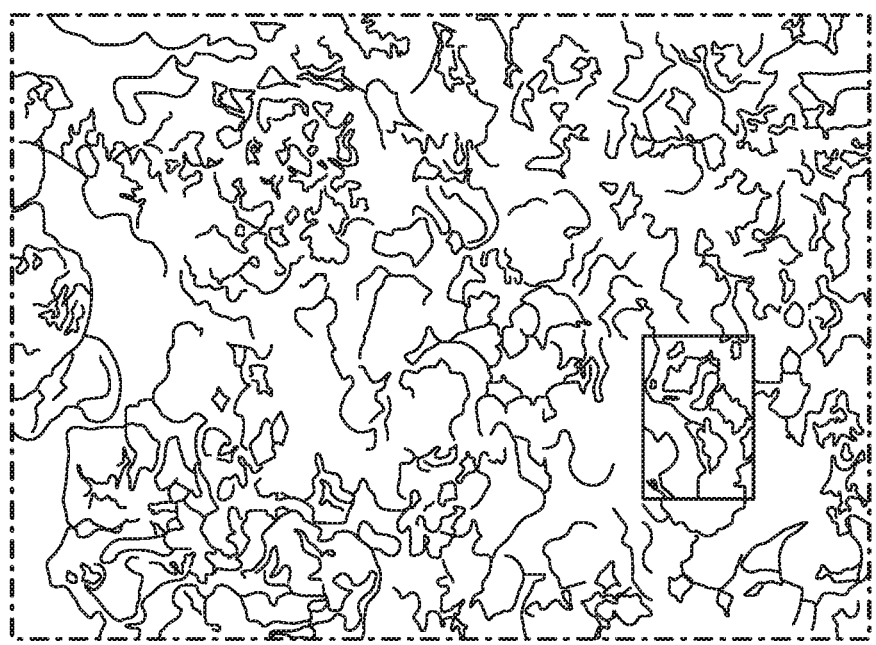
FIG. 1a presents a scanning electron microscope (SEM) image of titanium rich alumino magnisium silicate in which a first specific rectangular area is identified for additional analysis.

The present invention relates to the general field of well drilling, especially as it relates to exploration and development of petroleum sources of energy. The invention relates generally to a system and method to facilitate well drilling by reducing friction between drilling mud and other solid surfaces found downhole. In particular, the invention relates to the use of alumino magnesium silicate as a drilling mud ingredient or "additive".

Additionally, the invention also relates, at higher concentrations, to an improved thread compound. In particular, the invention achieves very low levels of frictional losses during make-up (torqueing) of pipe and can become a sealant using polymer phase transformations due to frivtional heating with the addition of minute quantities of a complexing agent.

BACKGROUND OF THE INVENTION

The drilling of wells (e.g., petroleum wells) is facilitated through use of "drilling muds." Drilling muds are formulated through the addition of various additives including barite (for weight and pressure control) and aluminum silicate, such as bentonite (for lubricating and cooling the drill bit and providing a firm filter cake on the bore wall). Bentonite is primarily composed of hydrous aluminum silicates and forms a gel in water-based drilling fluids.

These currently available drilling fluid lubricant additives fall short in many characteristics, including film strength and toughness relative to steel casing or abrasive formation minerals. Further, preservation of the surrounding formation is of utmost importance and limits the use of certain additives. Therefore, a new additive is needed that can meet the needs of high stress drilling.

This invention comprises a form of aluminum magnesium silicate as a water based additive that shows enhanced drilling performance compared to currently available aluminum silicates. The invention is referred to herein as "GSH Dry Lubricant Additive" or "GSH." GSH is, chemically, magnesium aluminum silicate. It is a clay rich in titanium, magnesium, and aluminum. Its properties are as such that it is highly beneficial to the drilling industry. It has a naturally high lubricity, a high stall torque, high gel strength, but a low plastic viscosity. This means that it effectively cools the bit while drilling, reduces friction in the system, supports cuttings better, but is easier to break out of a static gel strength than traditional engineered muds.

With the addition of polyvinyl alcohol derivate polymers, the invention provides better flow through the wall cake buildup process (i.e., better timing and quicker response). This allows for quicker filter cake creation with less flow into formation rock. And as a high suspendability, low solids content material, it acts as a natural gel-state cement for unconsolidated Loss Control Material (LCM) particles, effectively strengthening the wellbore.

DETAILED DESCRIPTION OF THE INVENTION

GSH comprises a form of aluminum magnesium silicate that shows enhanced drilling performance compared to aluminum silicates (bentonite). Aluminum magnesium silicate containing additional constituents, including, but not limited to magnesium (Mg) and titanium (Ti), provides enhanced lubricity of standard suspensions of alumino silicate clays.

Enhanced drilling fluid properties are a direct result of diffusion of a small amount of Mg into crystal lattice. The diffusion processes places a Mg atom or ion near an aluminum central atom of the octahedral layer, or the Mg is transported via diffusion in the water layer, which is located at the basal planes between the Silica tetrahedral sheets. This "solid" lubricant module can be added to the existing drilling lubricant such as TRAXX™ to impart strength to its film, which is currently lacking, or used as a standalone additive to increase the gel strength of the drilling fluid while reducing the viscosity of the drilling fluid: the characteristics that existing lubricants lack. Furthermore, the material subject of this application allows better packing of pore space and better development of internal filter cake, especially when various sizes of calcium carbonate and graphite are added to drilling fluid as LCM (lost circulation material).

FIG. 1a depicts an scanning electron microscope (SEM) image of the powder form of GSH dry powder lubricant. The purpose of this figure is to show the importance of flat particles in the mix. This is expected to reduce the fluid loss in this natural compound. Additionally, Table 1 (below) presents the analytical results of an elemental spectrum analysis within the rectangle shown in FIG. 1a.

TABLE 1

| Elt. | Line | Intensity (c/s) | Error 2-sig | Atomic % | Conc | |
|---|---|---|---|---|---|---|
| C | Ka | 2.02 | 0.284 | 3.627 | 2.102 | wt. % |
| O | Ka | 212.33 | 2.914 | 57.838 | 44.652 | wt. % |
| Na | Ka | 26.18 | 1.023 | 1.721 | 1.909 | wt. % |
| Mg | Ka | 26.12 | 1.022 | 1.076 | 1.262 | wt. % |
| Al | Ka | 226.15 | 3.008 | 6.842 | 8.908 | wt. % |
| Si | Ka | 909.64 | 6.032 | 26.114 | 35.390 | wt. % |
| S | Ka | 18.70 | 0.865 | 0.560 | 0.867 | wt. % |
| K | Ka | 17.68 | 0.841 | 0.355 | 0.670 | wt. % |
| Ca | Ka | 31.03 | 1.114 | 0.589 | 1.139 | wt. % |
| Ti | Ka | 48.99 | 1.400 | 0.888 | 2.050 | wt. % |
| Fe | Ka | 18.67 | 0.864 | 0.390 | 1.051 | wt. % |
| | | | | 100.000 | 100.000 | wt. % Total |

Figure 1B:
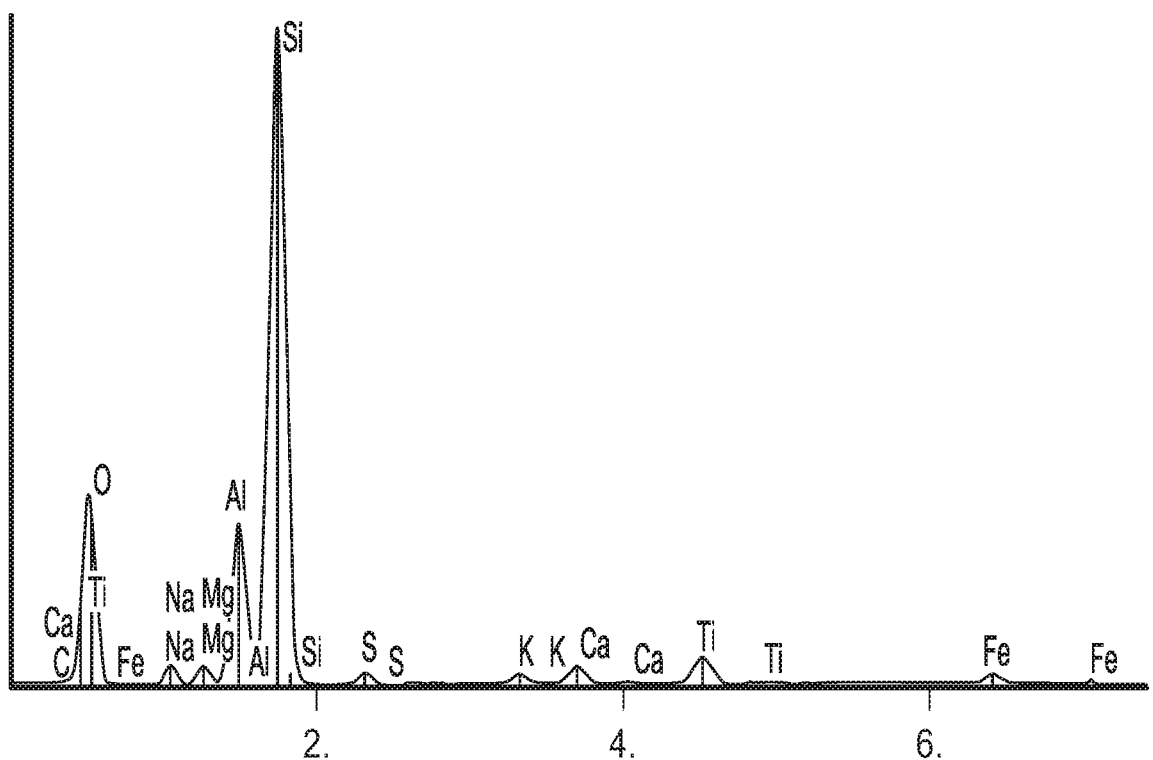

Multiple analysis were performed to identify the composition of GSH dry powder lubricant. Randomly selected areas described by a rectangle, as shown in FIG. 1a were tested using Energy Dispersion Spectrum (EDS) to identify the elements found in the above-mentioned area. This analysis indicates that the major constituents are Si, Al, Ti, Mg, as their relative percentages of weight are shown in FIG. 1b.

Figure 2A:
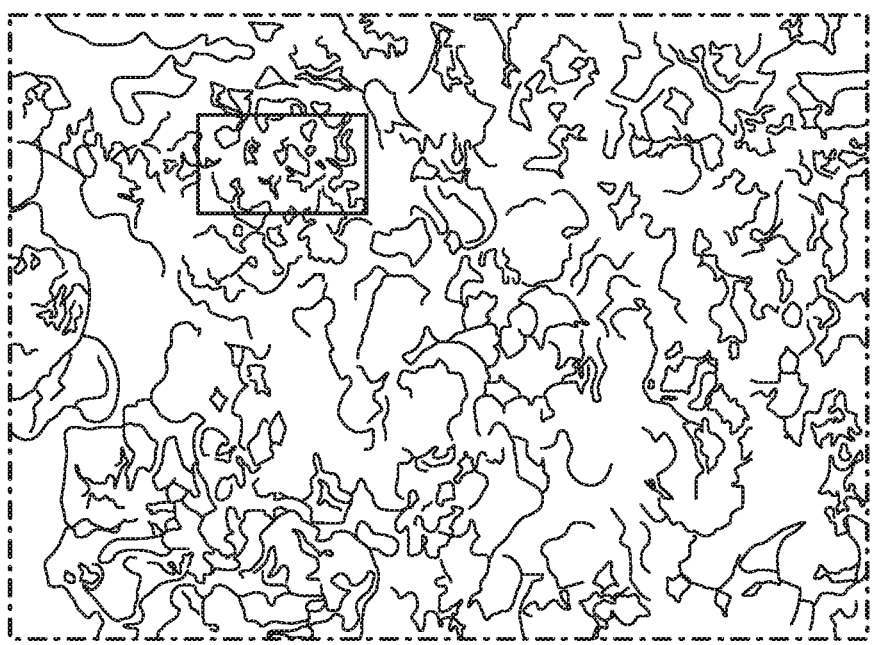
FIG. 2(a) presents a SEM image of titanium rich alumino magnisium silicate in which a second specific rectangular area is identified for additional analysis.
Figure 2B:
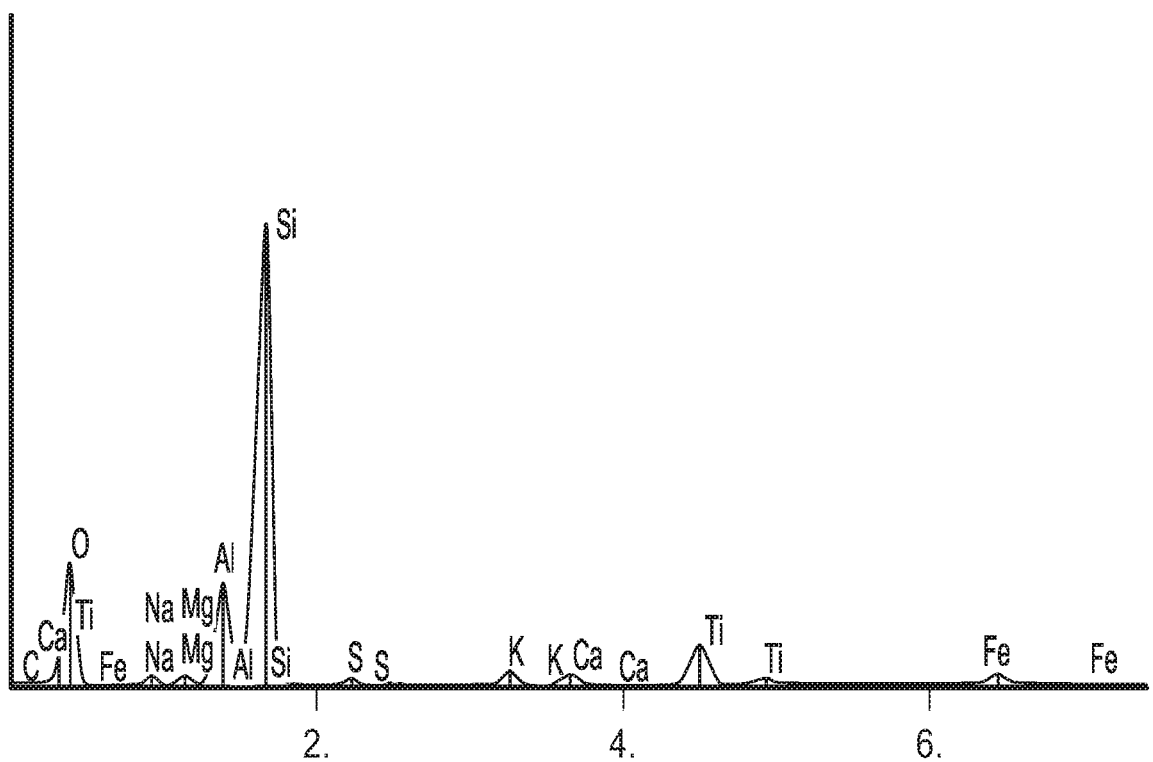

Both magnesium and titanium oxides form the foundation of the invention's lubricity. This is shown in FIGS. 2a, 2b, and Table 2 below presents the analytical results of an elemental spectrum analysis within the rectangle depicted in FIG. 2a.

TABLE 2

| Elt. | Line | Intensity (c/s) | Error 2-sig | Atomic % | Conc | |
|---|---|---|---|---|---|---|
| C | Ka | 1.14 | 0.213 | 3.068 | 1.742 | wt. % |
| O | Ka | 123.29 | 2.221 | 57.739 | 43.673 | wt. % |
| Na | Ka | 13.16 | 0.726 | 1.400 | 1.522 | wt. % |
| Mg | Ka | 12.71 | 0.713 | 0.837 | 0.961 | wt. % |
| Al | Ka | 130.92 | 2.288 | 6.258 | 7.983 | wt. % |
| Si | Ka | 592.61 | 4.869 | 26.385 | 35.033 | wt. % |
| S | Ka | 11.46 | 0.677 | 0.532 | 0.806 | wt. % |
| K | Ka | 25.12 | 1.002 | 0.785 | 1.451 | wt. % |
| Ca | Ka | 16.67 | 0.817 | 0.494 | 0.937 | wt. % |
| Ti | Ka | 66.94 | 1.636 | 1.897 | 4.293 | wt. % |
| Fe | Ka | 18.40 | 0.858 | 0.605 | 1.597 | wt. % |
| | | | | 100.000 | 100.000 | wt. % Total |

Further enhanced properties can be achieved by addition of high melting point resins, montan wax, shellac, polyvinyl alcohol, and other additives, resulting in improved fluid loss control and rheological properties modified (such as gelation).

The chemistry of GSH, when suspended in water, imparts a host of highly desirable rheological properties to the water based drilling fluid. This includes improvements in the fluid's lubricity, film strength—including its significant impact on Plastic Viscosity (PV), Gel Strength, Lubricity, and the lubricant Film Strength.

To demonstrate these desirable characteristics, the chemistry of GSH and Generic 7 are compared herein and presented in Tables 3, 4, and 5. Generic 7 is a standardized mixture by which other materials are compared in the art, and is indicative of an average 12-ppg mud including bentonite, barite, earth solids, calcium carbonate, dispersants such as lignite, and other additives.

Sample A is a mixture of 350 cc of water, 22 grams of GSH, and enough barite to weight it up to 12 ppg. Table 4 (below) presents the lubricity and stalling torque for Generic 7 vs. Sample A. As shown the Table 4, Sample

TABLE 4

| TORQUE | Generic 7 AMPS | Sample A AMPS |
|---|---|---|
| 100 | 16.4 | 10.1 |
| 200 | 28.8 | 20.8 |
| 300 | 44 | 32.4 |
| 400 | Stalled | 49.4 |
| 500 | | 60.8 |
| 600 | | Stalled |

Figure 3:
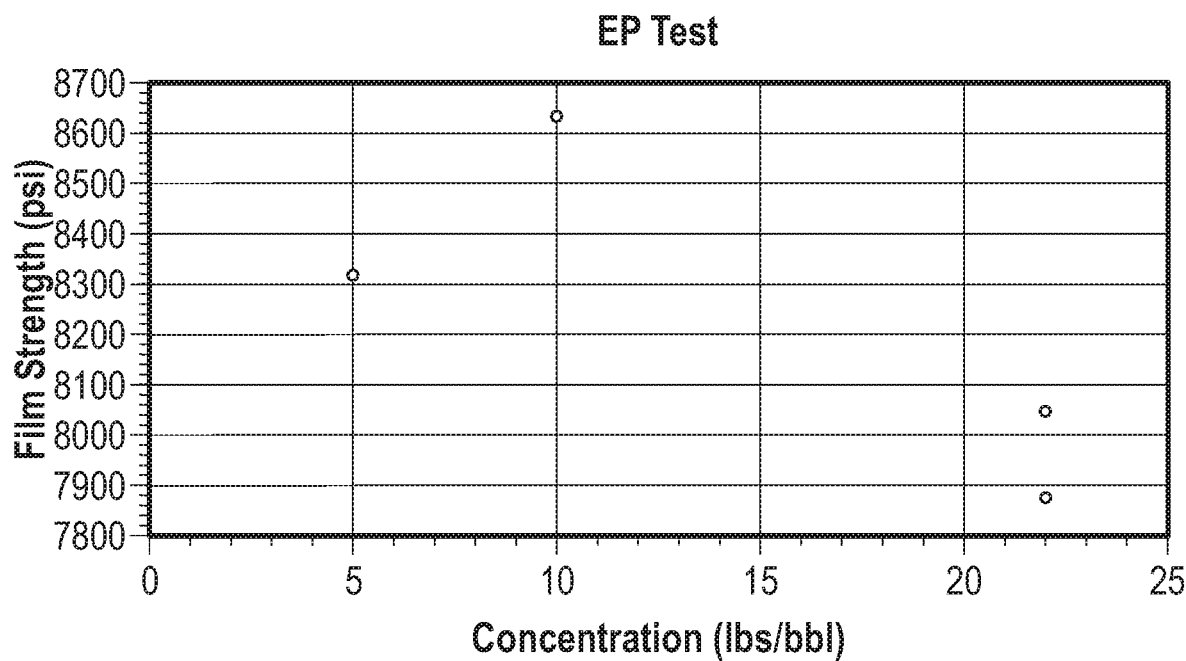
FIG. 3 presents a plot relating the GSH lubricant concentration versus film strength.

A has a higher tolerance for torque before stalling. Table 5 (below) shows the optimum film resistance at a concentration of 10 lb/bbl. This data is also presented graphically in FIG. 3. Three trials contain mixtures of water and GSH and the

TABLE 5

| Trial | Concentration (lbs/bbl) | Torque (in-lbs) | Scar Width (hundreth in) | Film Strength (psi) |
|---|---|---|---|---|
| 1 (slightly inconclusive) | 22 | 600 | 39.73 | 8049.332998 |
| 2 | 10 | 350 | 21.6 | 8636.574074 |
| 3 | 5 | 290 | 18.58 | 8319.160388 |
| 4 (Bentonite) | 22 | 510 | 34.51 | 7876.847291 | fourth trial contains bentonite in water. Each of the three trials with GSH show a higher film strength than the trial with bentonite.

Figure 4:
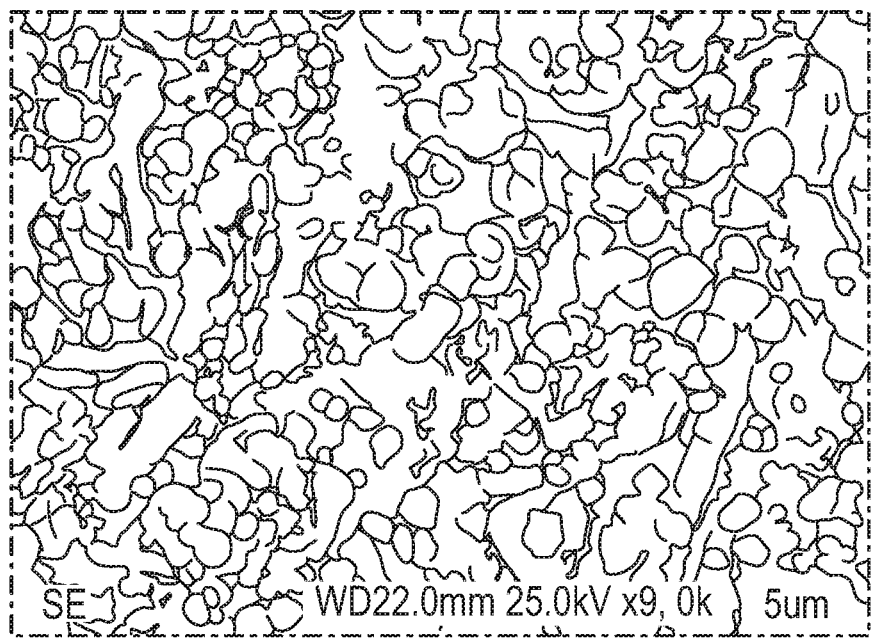
FIG. 4 presents a SEM image of the fine fraction (0.5 Micron Calcite) of the Coarse Grade Loss Control Material (LCM) blend of 10 lb/bbl.
Figure 5:
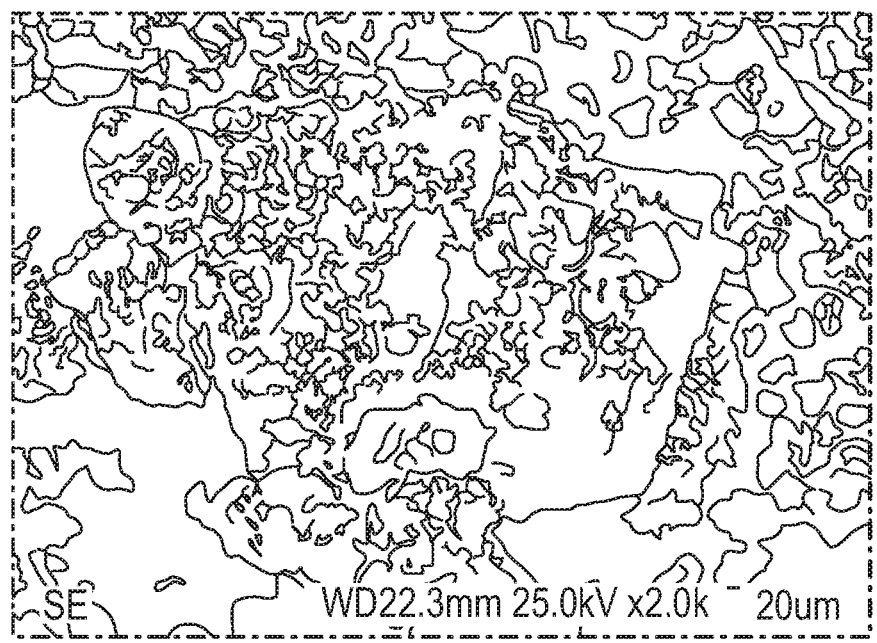
FIG. 5 presents a SEM image of the fine fraction, (2 Micron Calcite), of the Coarse LCM blend
Figure 6:
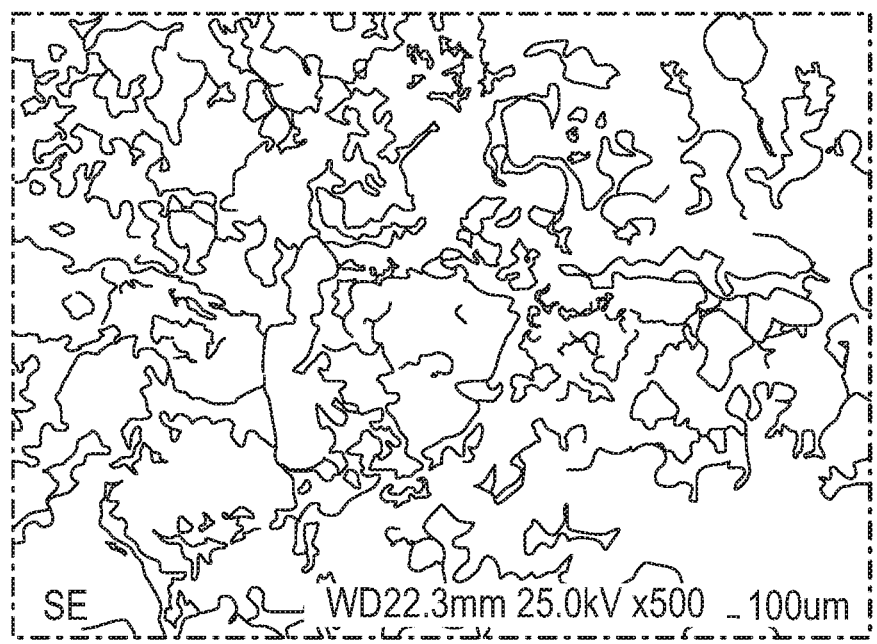
FIG. 6 presents a SEM image of the fine fraction (10 Micron Calcite) of the Coarse LCM blend.

GSH also interacts with LCM to provide enhanced properties. The currently available LCM mixtures comprise ground Calcite (CaCO$_3$) and Graphite (a highly stable carbon). These mixes are offered in the market as Fine Grade, Medium Grade, and Coarse Grade LCM. The Coarse Grade LCM could contain a large amount of very fine sub-micron particles. FIGS. 4, 5, and 6 demonstrate the increase in desirable properties when GSH is integrated with LCM.

In FIG. 4, the larger flat and "stringy" particles are Graphite and the smaller, rounder particles are Ultra-Fine Fraction of Calcite. Small Calcite particles fill the empty spaces in a distinct pattern or agglomerate, as group, in a certain pattern. In FIG. 5, the larger flat particles are Graphite and the smaller, about 10 times, and rounder particles are Calcite. The Calcite particles either ride on Graphite or coat it. Generally, the smaller particles avoid filling the pores thus leaving the empty spaces empty, which is not a desired outcome. In FIG. 6, The larger flat particles are Graphite and the smaller particles are Calcite.

FIGS. 4, 5, and 6 indicate that the smaller the blend particles, the more effective the blend is in filling the empty spaces, which is a highly desirable outcome. However, a strong force is required to keep the smallest particles firm in their place, in the pores and micro cracks. GSH possesses the desirable material property that keeps small particles in place (also known as its "time dependent Gel strength"). The "force" provided by GSH that keeps the small calcite particles in place is demonstrated in Table 3 (below) as compared to Generic 7, along with relevant other characteristics. The Gel Strength of GSH becomes stronger with time, which is due to the imbalance of electron charges within the crystal structure of the alumino-silicates. Moreover, GSH's Gel Strength increases as the fluid viscosity decreases.

TABLE 3

|  | Generic 7 | Sample A |
| --- | --- | --- |
| Mud Weight PPG | 12 | 12.1 |
| Plastic Viscosity (cP) | 31 | 4 |
| Yield Point (lb/100 sq ft) | 8 | 12 |
| Gel Strength 10 sec/10 min | 5/8/11 | 10/12/15 |
| Ph | 10.4 | 9.4 |

GSH has significantly clearer supernatant clarity than bentonite clarity (at 22 lbs/bbl). Thus, many applications for water and oily water clean-up can be designed using clarification principles of the GSH compound chemistry.

Although GSH could be used to supplement bentonite, it is capable of replacing bentonite entirely, especially at high temperatures, with the addition of some additives, including, but not limited to sapiolite.

Figure 7:
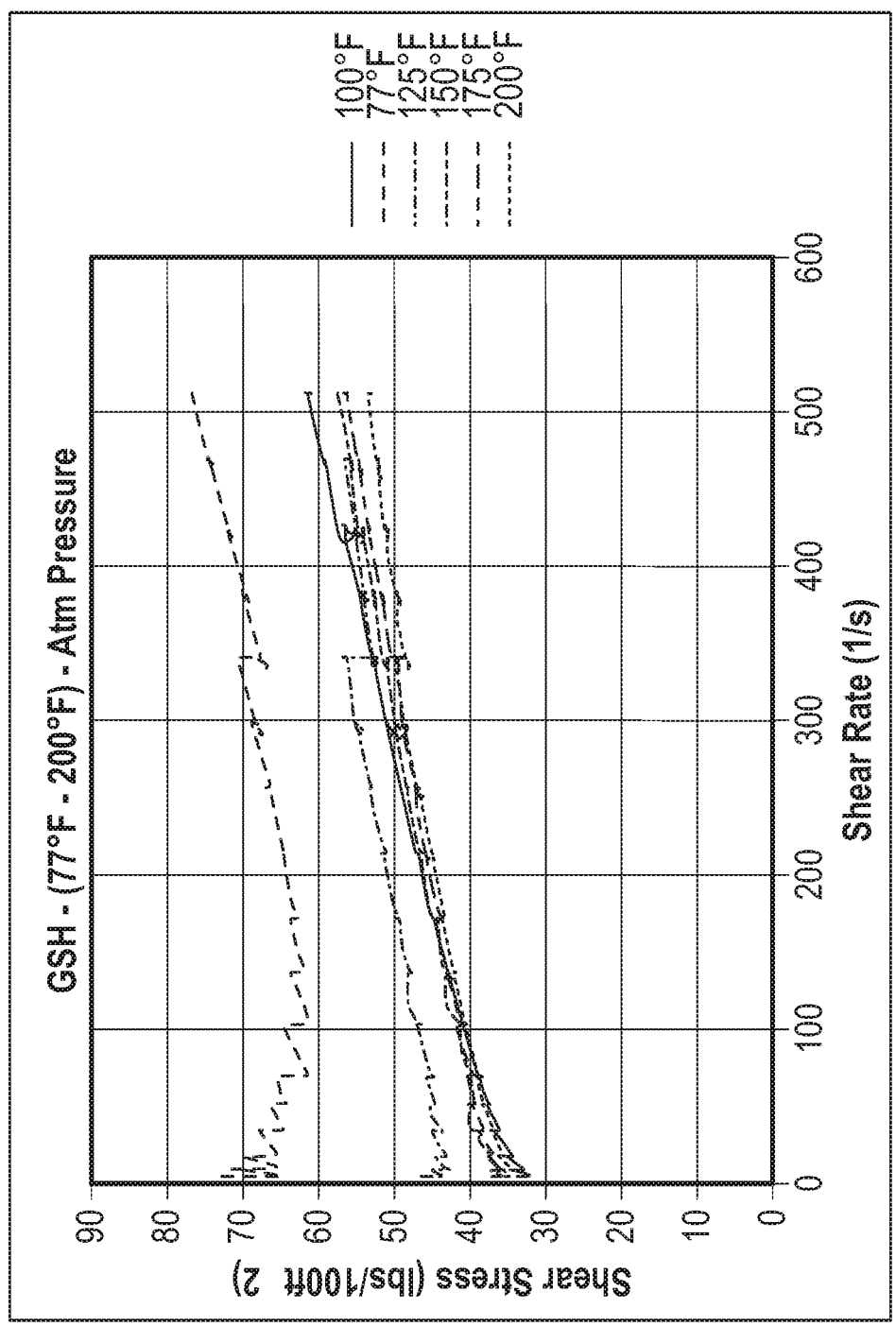
FIG. 7 presents a graph demonstrating the Shear Rate vs. Shear Stress for GSH.
Figure 8:
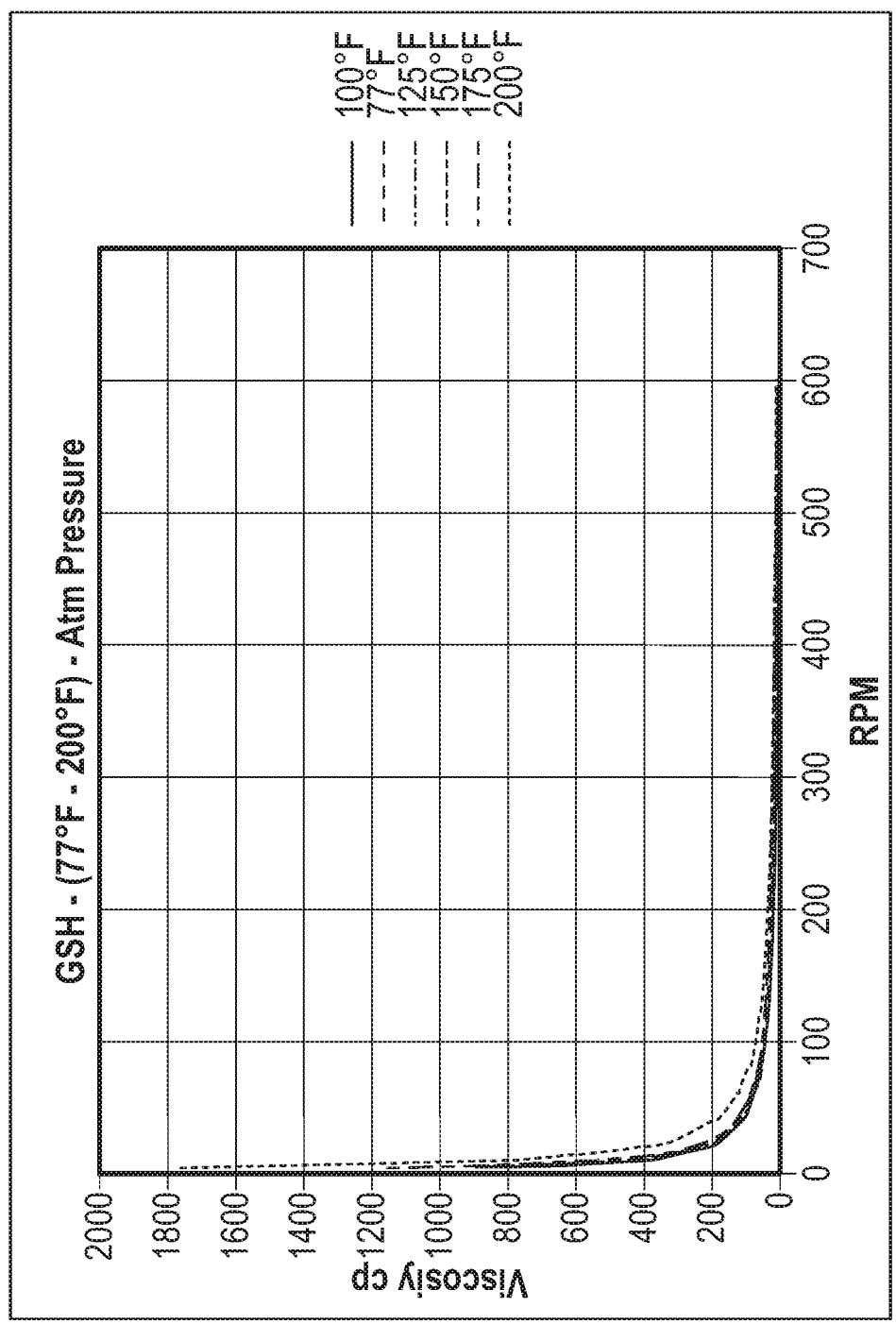
FIG. 8 presents a graph demonstrating the RPM vs. Viscosity for GSH.

According to FIG. 7, under isobaric constraints at atmospheric pressure, GSH remains stable from room temperature until it nears the boiling point of water. After this point the fluid begins to degrade and increase in gel strength and viscosity. Before breakdown at isobaric conditions, the system is stable and consistent. The rate at which the drag on the system increases remains constant throughout the test, as evidenced by the slopes of the lines. This indicates that GSH as an additive provides stable fluid characteristics under pressure at upwards of 350-500 degrees Fahrenheit. And, according to FIG. 8, Under isobaric constraints at atmospheric pressure, the thermoregulation of the system did not significantly impact the viscosity profile, indicating a high stability of the fluid in question. This is a significant improvement over currently available additives and allows GSH to meet the needs of the industry for a more durable and stable additive.

The GSH fluid may be diffused into various polymers. In one embodiment, polyvinyl alcohol derivate polymers may be used. For example, PVA-high molecular weight, partially hydrolyzed (average 88,000-98,000) and commercially available from Sigma-Aldrica ("Polymer B") may be used. In other embodiments, PVA-low molecular weight, partially hydrolyzed (average 88,000) and commercially available from Spectrum Chemical Manufacturing Corporation ("Polymer A") may be used.

Example 1

Figure 9:
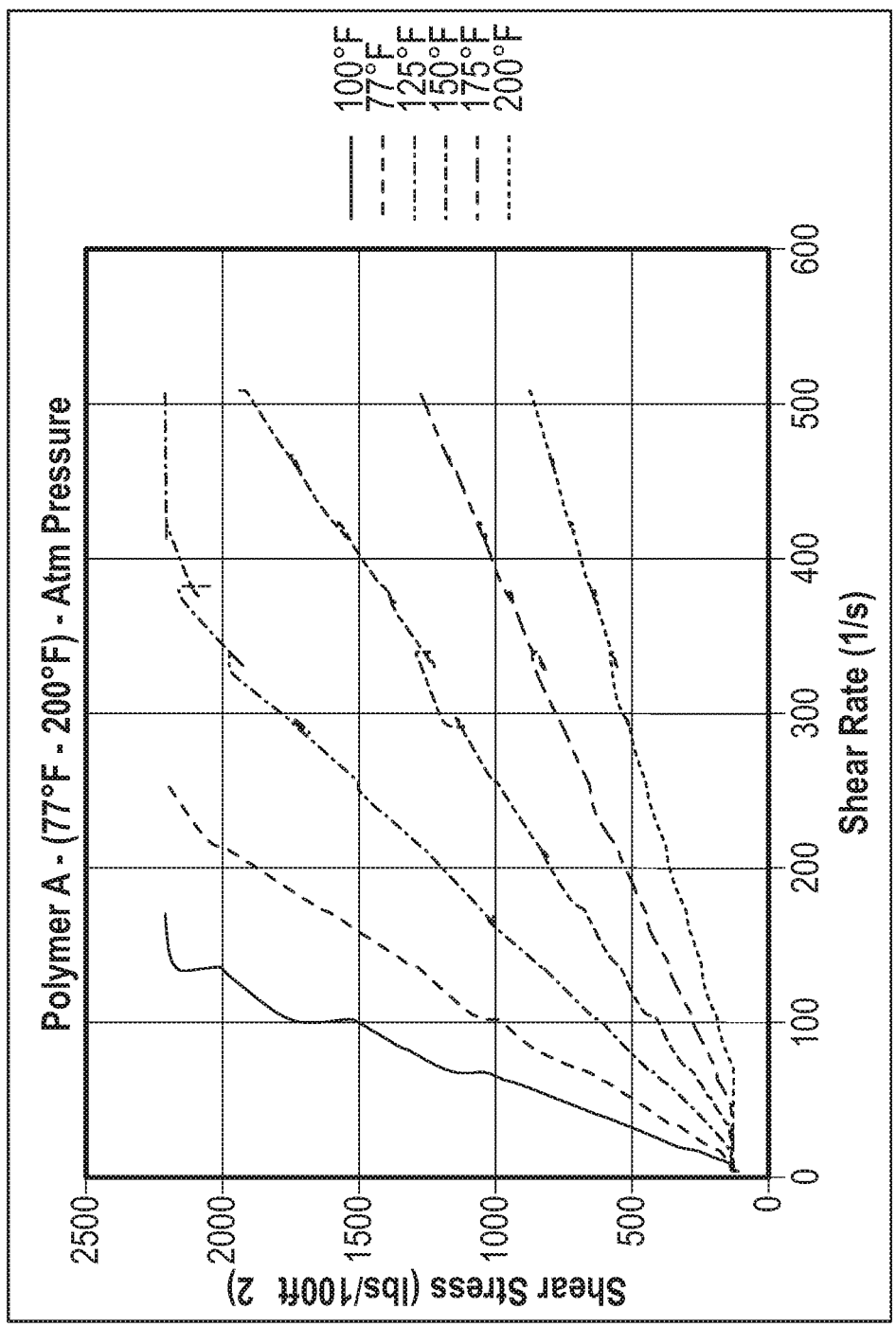
FIG. 9 presents a graph demonstrating the Shear Rate vs. Shear Stress for Polymer A.

The effects of various polymers are shown in FIGS. 9-16. FIG. 9 presents the shear rate versus the shear stress for Polymer A. Under isobaric constraints at atmospheric pressure, Polymer A's viscosity profiles decreases significantly with each incremental increase in temperature. The increase in drag in the system (evidenced by the slope) decreases sharply with temperature. Due to machine limitations, values of shear stress above 2150 lbs/100 ft$^2$ cannot be read, which generates the plateaus values in the curves of the three lowest temperatures.

Figure 10:
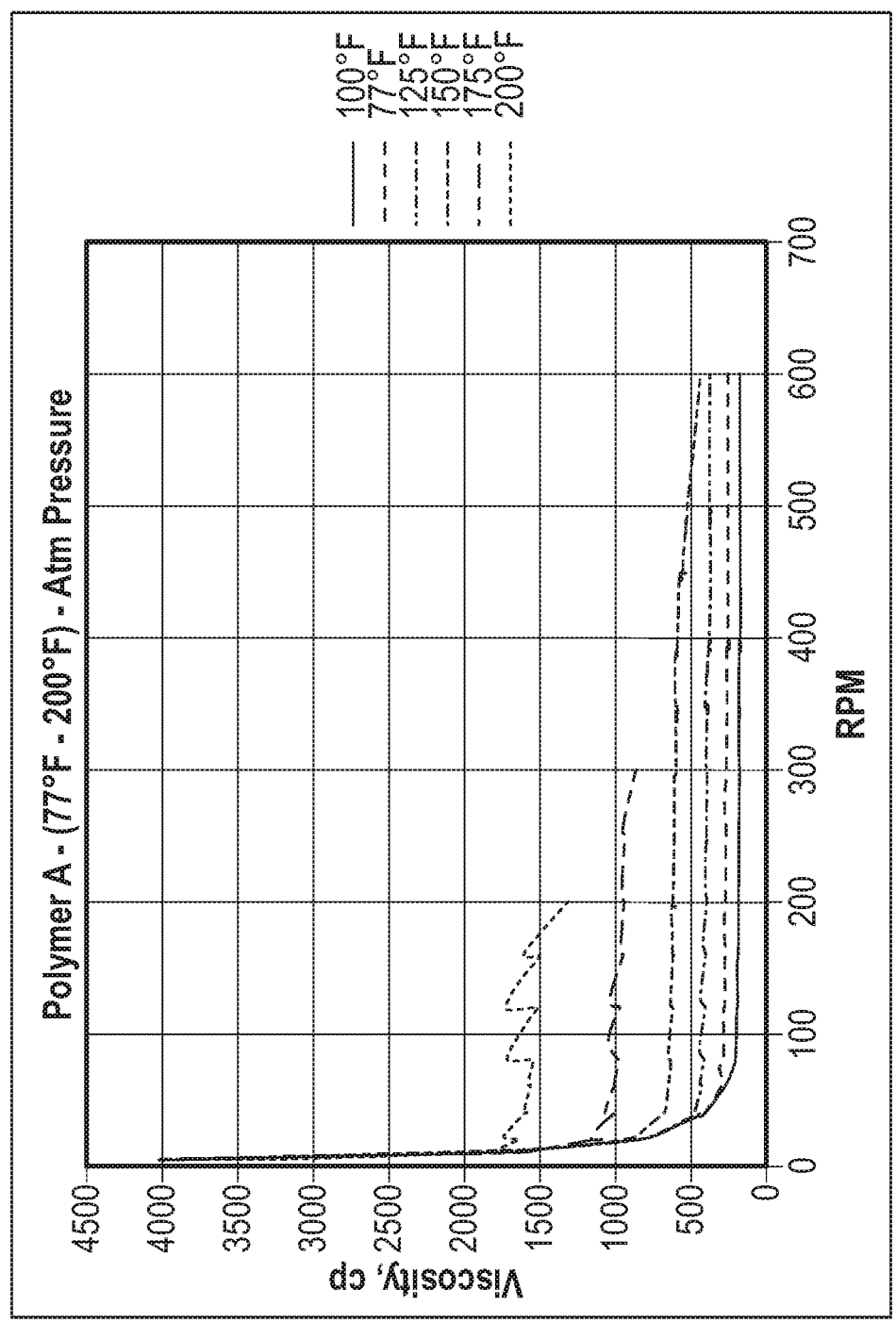
FIG. 10 presents a graph demonstrating the RPM vs. Viscosity of Polymer A.

FIG. 10 demonstrates that Polymer A's profile approaches varying final viscosities with each incremental change in temperature. Due to machine limitations noted above, Polymer A shows an incomplete data set for the lower two temperatures. The sensors were unable to read such high values of shear stress. Despite these shortcomings, it is easy to see that the material's viscosity profile changed consistently with rpm.

Figure 11:
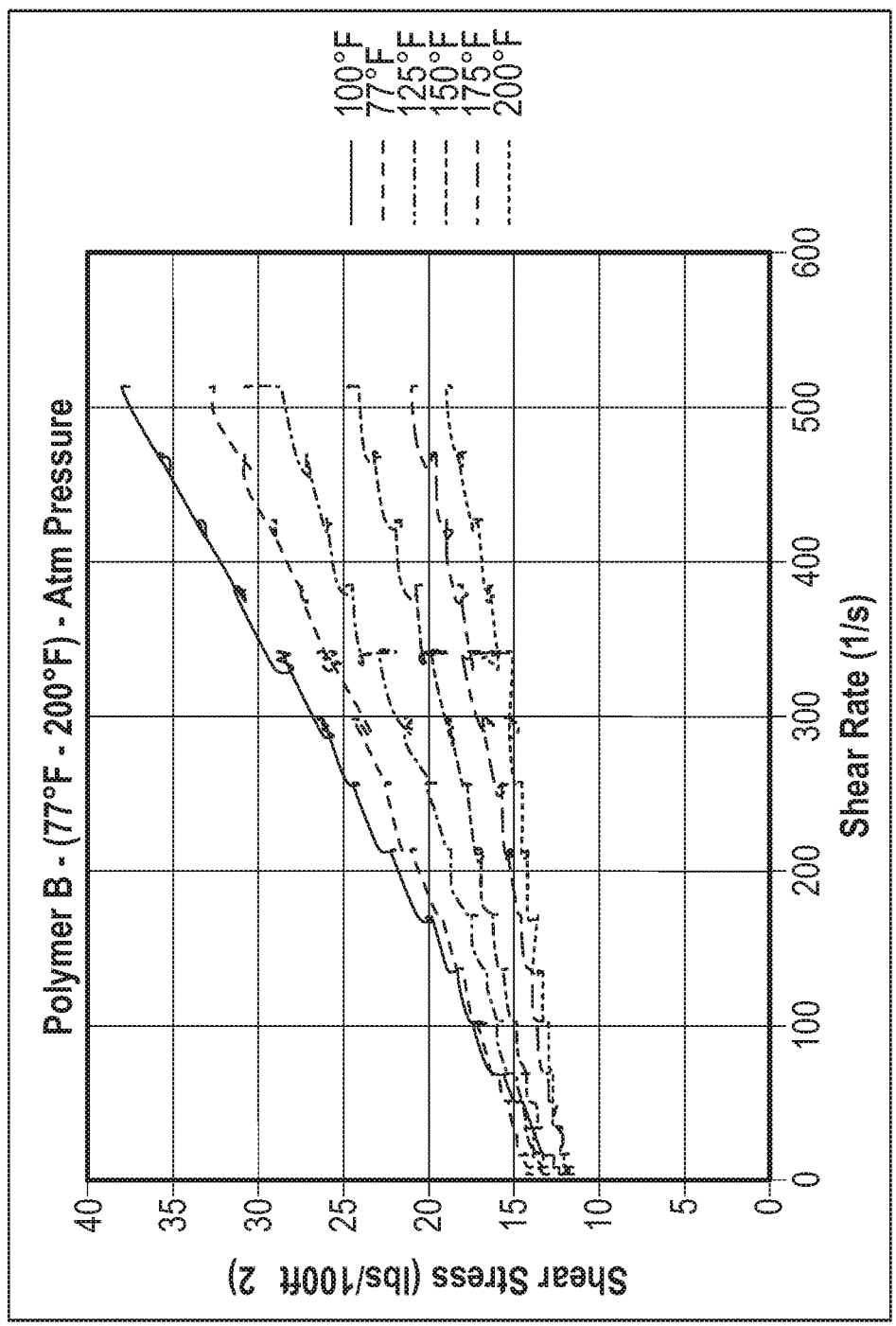
FIG. 11 presents a graph demonstrating the Shear Rate vs. Shear Stress of Polymer B.

Under isobaric constraints at atmospheric pressure, Polymer B exhibits gel strength values even lower than GSH, but the tight tolerance across thermal increases the desirable characteristics of Polymer B. As shown in FIG. 11, the slope of each line became less pronounced as temperature increases, indicating that the fluid acts more uniformly at higher temperatures. Accordingly, Polymer B's fluid properties are more consistent with that of a typical drilling fluid than Polymer A.

Figure 12:
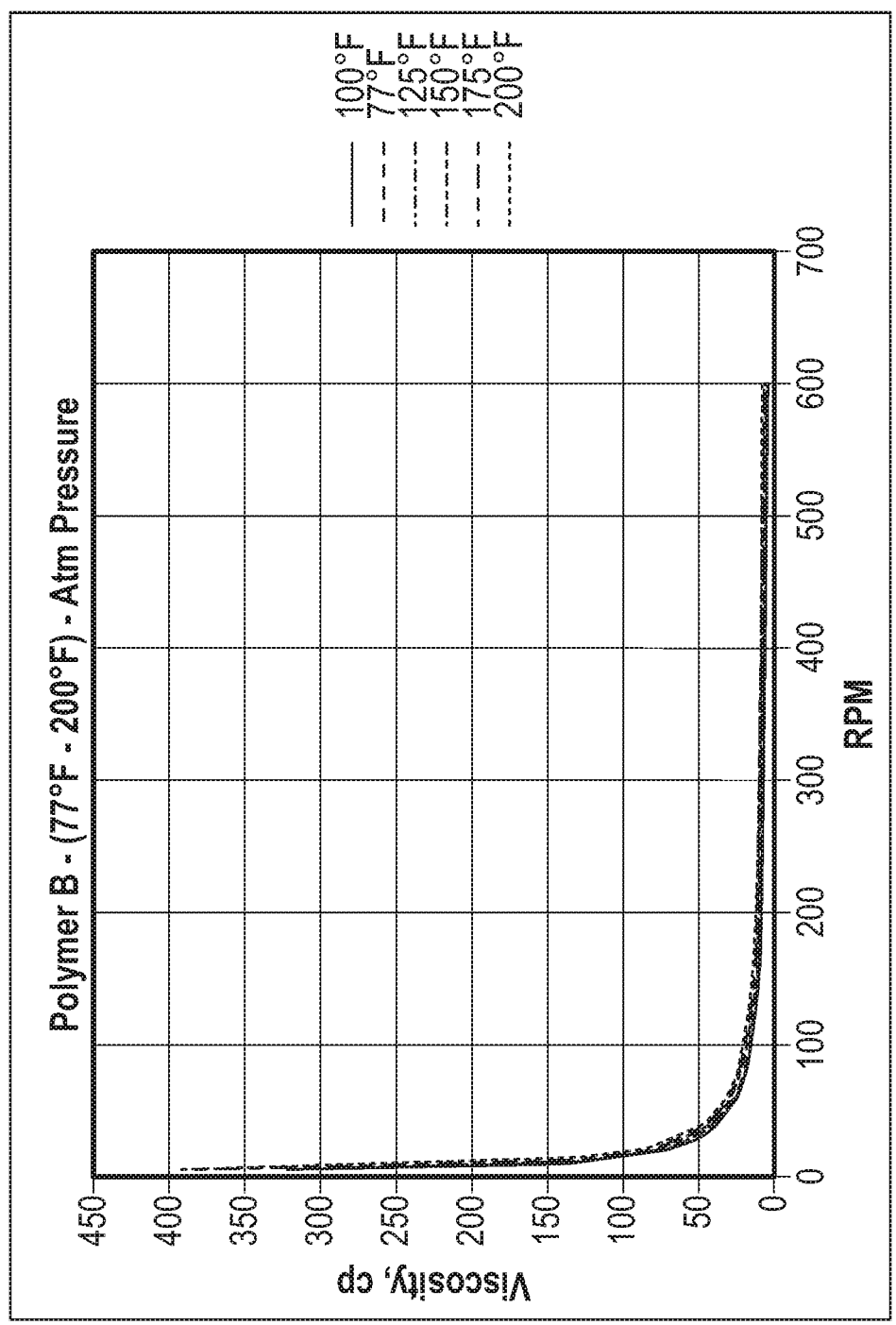
FIG. 12 presents a graph demonstrating the RPM vs. Viscosity of Polymer B.

FIG. 12 shows that under isobaric constraints at atmospheric pressure, the thermoregulation of the system did not significantly impact the viscosity profile, indicating a high stability of the fluid in question. High stability is a desirable property.

Figure 13:
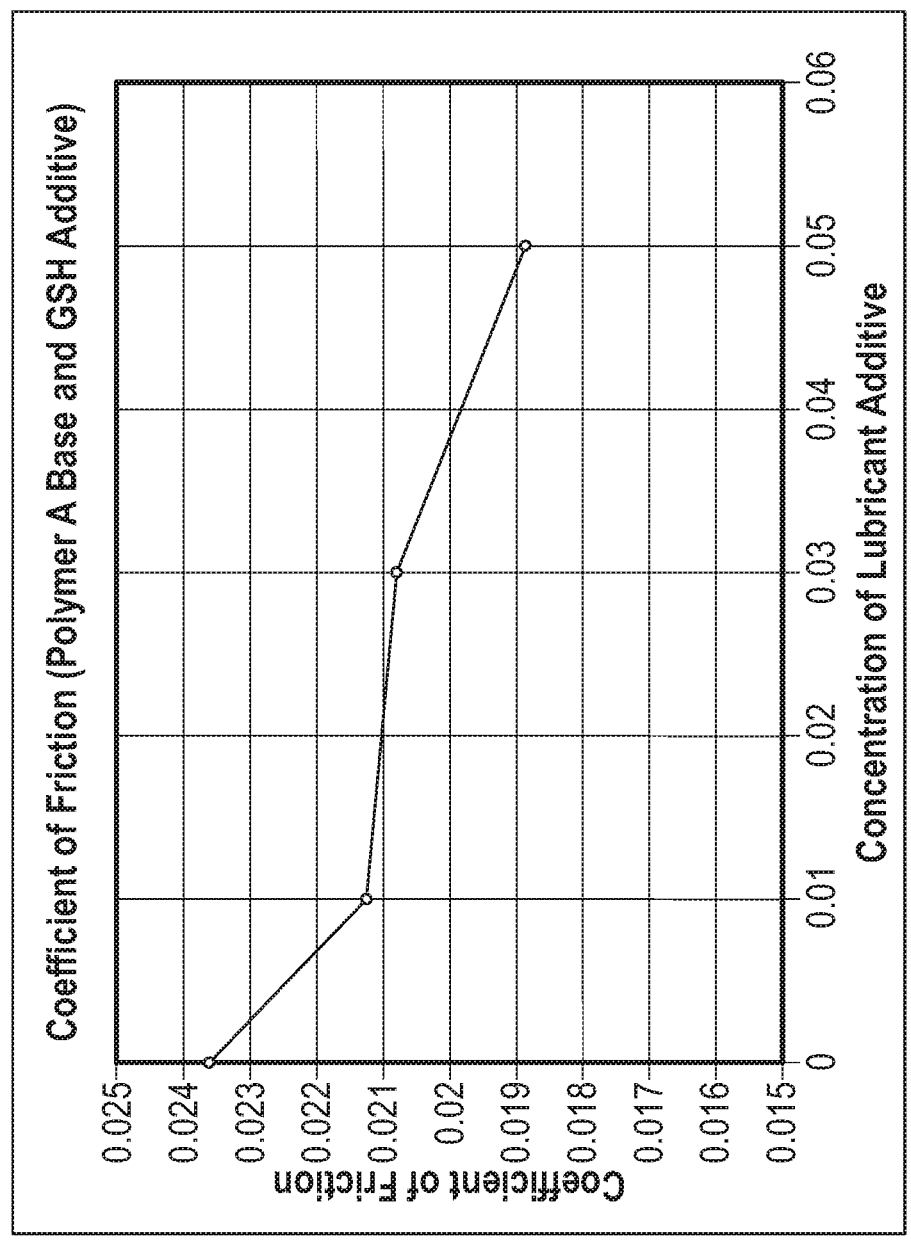
FIG. 13 presents a graph demonstrating the Coefficient of Friction for Polymer A Base with GSH Additive.
Figure 14:
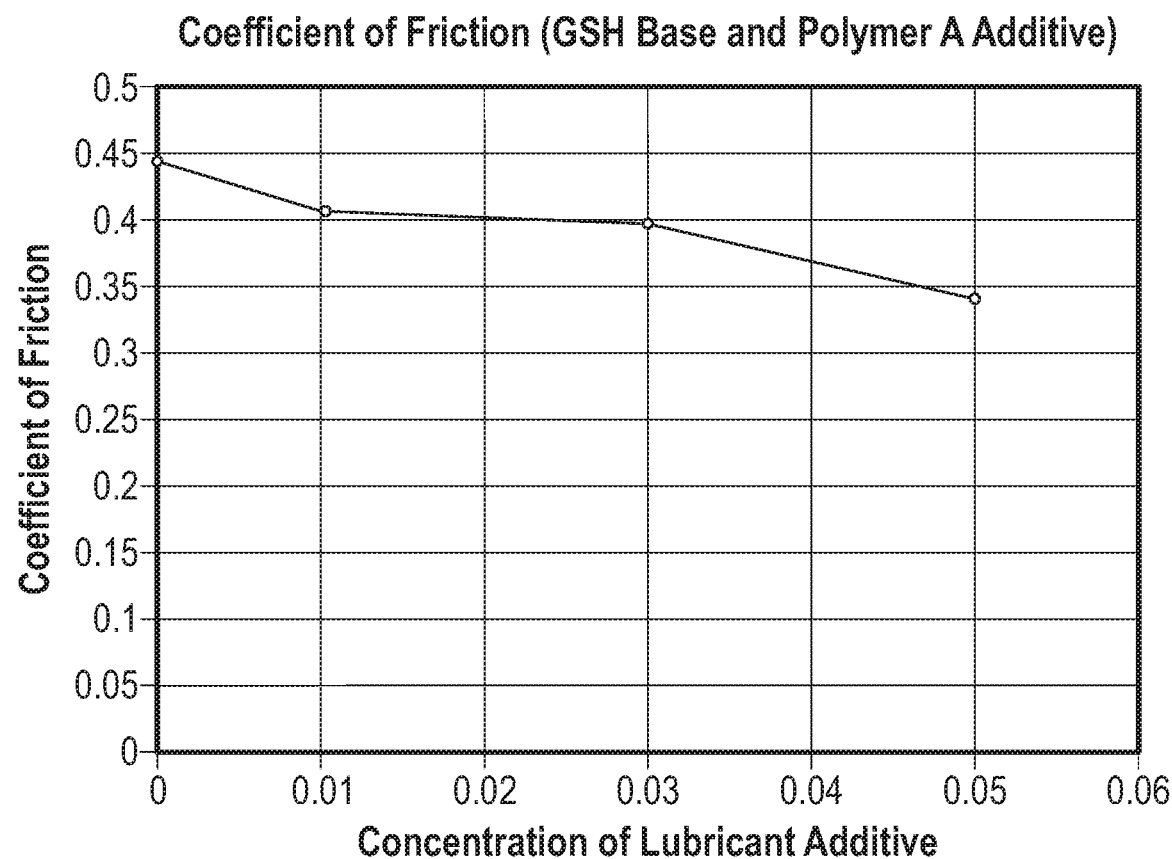
FIG. 14 presents a graph demonstrating the Coefficient of Friction for GSH with Polymer A Additive.
Figure 15:
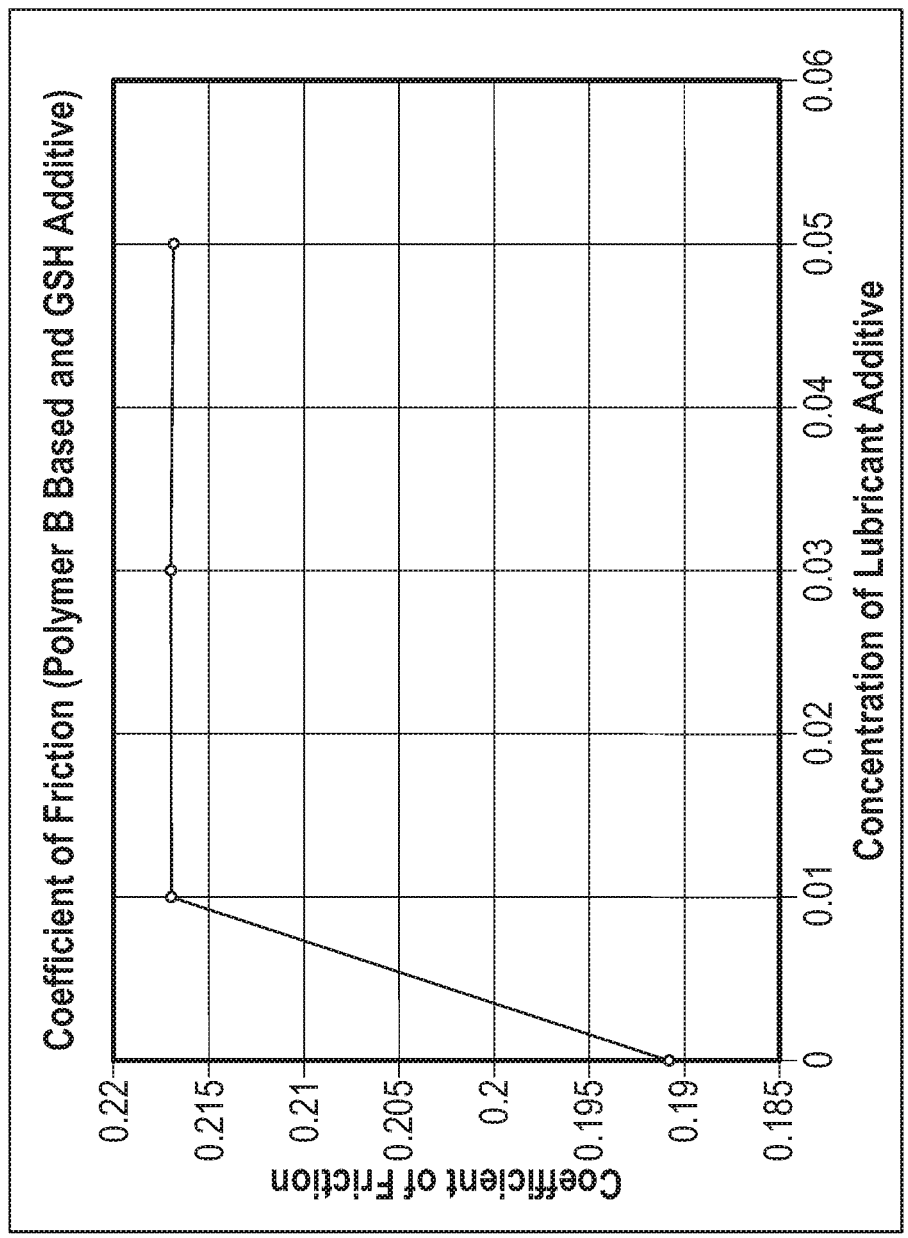
FIG. 15 presents a graph demonstrating the Coefficient of Friction for Polymer B with GSH Additive.
Figure 16:
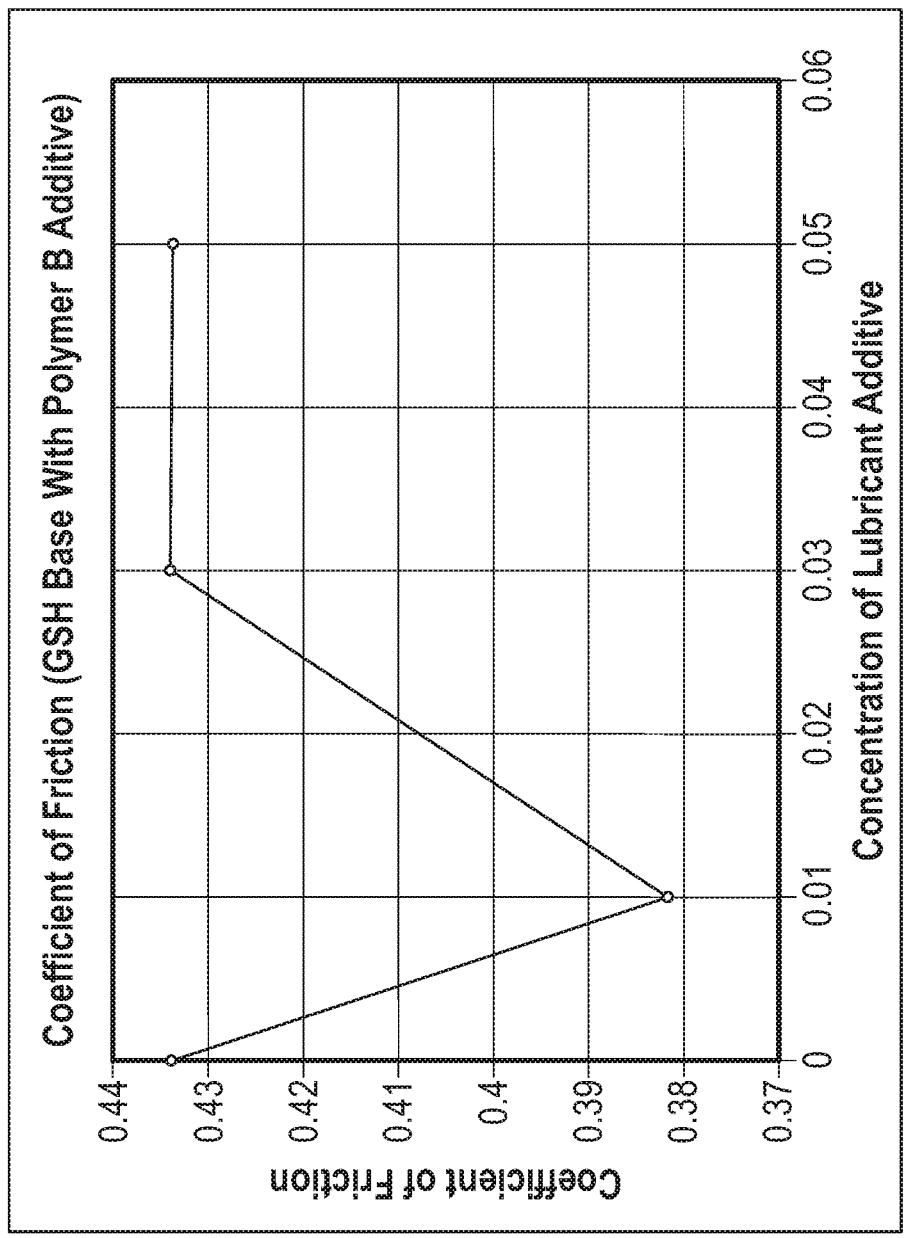
FIG. 16 presents a graph demonstrating the Coefficient of Friction for GSH with Polymer B Additive.

FIG. 13 shows the measurement of the coefficient of friction of Polymer A with GSH as an additive at 0, 1, 3, and 5% concentration by volume and FIG. 14 shows the same for GSH with Polymer A as an additive at 0, 1, 3, and 5% concentration by volume. According to FIG. 13, as more GSH is added to the system, the coefficient of friction drops from 0.0237 to 0.0189 and according to FIG. 14, as more Polymer A is added to the system, the coefficient of friction drops from 0.44 to 0.34. FIGS. 15 and 16 show similar conditions for Polymer B. Specifically, FIG. 15 shows measurement of the coefficient of friction of Polymer B with GSH as an additive at 0, 1, 3, and 5% concentration by volume. The addition of GSH to the system increases the coefficient of friction in a manner seemingly independent of concentration. And FIG. 16 shows measurement of the coefficient of friction of GSH with Polymer B as an additive at 0, 1, 3, and 5% concentration by volume.

Figure 17:
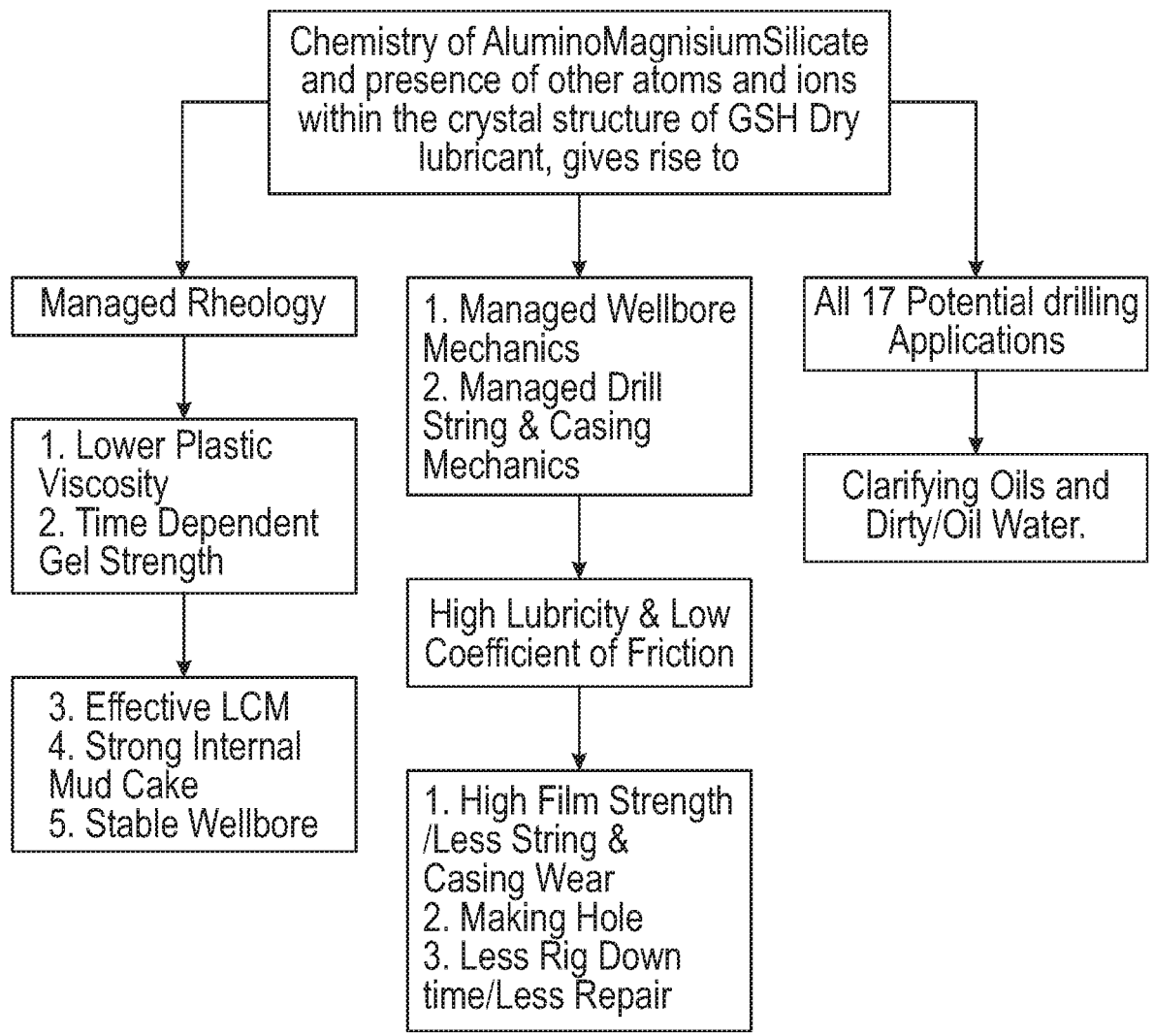
FIG. 17 is a diagram presenting information relating various drilling functions and GSH material properties.

Additionally, FIG. 17 presents information relating various drilling functions and GSH material properties.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Furthermore, the described features, structures, or characteristics may be combined in any suitable manner in one or more embodiments.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

The invention claimed is:

1. A drilling mud additive comprising:
   a. a determined volume of water; and
   b. GSH Dry Lubricant comprising at least 4 percent concentration by weight of Titanium; wherein said GSH Dry Lubricant is suspended in said water.

2. The additive of claim 1 further comprising barite to weight said drilling mud additive.

3. The additive of claim 2 comprising 350 cc of said water, 22 grams of said GSH Dry Lubricant, and enough barite to weight said additive to 12 ppg.

4. The additive of claim 1 further comprising lost circulation material chosen from the group consisting of calcite and graphite.

5. The additive of claim 1 further comprising bentonite.

6. The additive of claim 1 further comprising sapiolite.

7. The additive of claim 1 wherein said GSH Dry Lubricant is diffused into a polymer.

8. The additive of claim 7 wherein said polymer comprises a polyvinyl alcohol derivative polymer.

* * * * *